United States Patent [19]

Hunsberger

[11] Patent Number: 5,074,895
[45] Date of Patent: Dec. 24, 1991

[54] INTERMITTENT DRIVE FOR BAG HOUSE CLEANING HEAD

[75] Inventor: Lewis E. Hunsberger, Mukilteo, Wash.

[73] Assignee: H & R Mechanical Systems, Everett, Wash.

[21] Appl. No.: 537,295

[22] Filed: Jun. 13, 1990

[51] Int. Cl.⁵ .............................................. B01D 46/00
[52] U.S. Cl. ................................... 55/28.4; 55/294; 55/337; 74/116
[58] Field of Search .................. 55/96, 284, 294, 286, 55/302, 337, 379; 74/112, 577 S, 125.5, 116; 210/333.1, 415

[56] References Cited

U.S. PATENT DOCUMENTS

| | | | |
|---|---|---|---|
| 3,072,910 | 1/1963 | Snyder | 74/116 |
| 3,176,846 | 4/1965 | Adams | 210/333 |
| 3,234,714 | 2/1966 | Rymer et al. | 55/294 |
| 3,320,726 | 5/1967 | Black, Jr. | 55/294 |
| 3,325,978 | 6/1967 | Rymer et al. | 55/294 |
| 3,332,217 | 7/1967 | Rymer | 55/302 |
| 3,813,853 | 6/1974 | Anderson | 55/96 |
| 3,854,910 | 12/1974 | Hammerquist | 55/287 |
| 4,022,595 | 5/1977 | Noland | 55/273 |
| 4,154,589 | 5/1979 | Crawford et al. | 55/294 |
| 4,306,890 | 12/1981 | Gustavsson et al. | 55/273 |
| 4,373,939 | 2/1983 | Limbocker | 55/294 |

FOREIGN PATENT DOCUMENTS 410798 7/1974 U.S.S.R. ................................ 55/294

Primary Examiner—Bernard Nozick
Attorney, Agent, or Firm—Christensen, O'Connor, Johnson & Kindness

[57] ABSTRACT

An intermittent drive (10) for intermittently advancing a cleaning head (50) for sequential cleaning of filter bags (44) in a bag house (12). The intermittent drive includes a ratchet wheel (80) secured to a central shaft (74) on which the cleaning head is radially mounted. A drive plate (90) in proximity to the ratchet wheel is continuously rotated by a drive motor (83) about a drive axis (88). An elongated drive arm (94) has a base end portion (100) pinned to the upper surface (92) of the drive plate at a point radially offset from the drive axis. The drive arm (94) also has a distal end portion (102) that is engageable with the teeth (82) of the ratchet wheel. The bottom surface (98) of the drive arm frictionally contacts the upper surface of drive plate to urge the drive arm into engagement with the ratchet wheel teeth. During a part of each rotation of the drive plate, the distal end portion of the drive arm slides over a tooth of the ratchet wheel, and the ratchet wheel and cleaning head remains stationary. During the completion of each rotation of the drive plate, the distal end portion of the drive arm engages a tooth of the ratchet wheel and rotatably advances the ratchet wheel to index the cleaning head.

23 Claims, 3 Drawing Sheets

INTERMITTENT DRIVE FOR BAG HOUSE CLEANING HEAD

FIELD OF THE INVENTION

The present invention relates to filtering systems and, more particularly, to an intermittent drive for a bag house filter system cleaning head.

BACKGROUND OF THE INVENTION

Bag house filter systems are well known in the art for removing particulate matter from gaseous streams. Often bag house filter systems are employed for removing particulates from air streams prior to exhausting the air to the atmosphere. Conventional bag house filter systems include a filter chamber having an inlet for receiving particle-laden air, a filtered air outlet, and a particulate matter discharge outlet. The filter chamber is generally partitioned so that the air stream is passed through a number of separate, air pervious filter bags mounted therein for entrainment of the particulate matter. Filter bags are typically of elongated tubular configuration mounted in parallel fashion within the filter chamber and supported by a plate which transversely partitions the filter chamber between the air inlet and the filter bags. Typically each filter bag has an open end that is fluidly connected to an opening in the support plate so as to receive a portion of the air stream flowing through the filter system, with the other end of the filter bag being closed. The filter bags are often supported internally by a tubular wire mesh structure.

In normal operation, a positive air pressure causes the air stream to flow through the porous tubular walls of the filter bags and out the outlet of the apparatus. The particulate matter is retained within the filter bags.

After a period of usage, particulate matter cakes on the inside walls of the filter bags and must be periodically removed to ensure efficient operation of the filter system. Conventional bag house systems include a cleaning mechanism for removing the caked particulate matter from the inside of the filter bags. Typically a cleaning head is swept across the open ends of the filter bags to clean them, either individually or in small groupings. The cleaning head is in fluid communication with a reverse air stream, and when aligned with the openings to one or more filter bags draws a suction through the filter bags. The suction causes the filter bags to collapse on the supporting wire frame and the caked particulate matter to fall from the filter bag walls, where it is ultimately discharged through the particulate matter discharge outlet. One such conventional bag house cleaning system is disclosed by U.S. Pat. No. 3,854,910 to Hammerquist, wherein the filter bags are arranged radially about a central axis of the filter chamber. The cleaning head is mounted on a sweep arm that sweeps radially around the filter chamber to sequentially pass over the opening of each filter bag.

Other conventional bag house configurations utilize air stream flows reversed for that described above. In such a configuration the contaminated air stream passes from the outside of the filter bags, through the filter bag walls, and exits through the open ends of the filter bags. The particulate matter cakes on the outside of the filter bags and is removed periodically by a continuously sweeping cleaning head that delivers compressed air to the openings of the filter bags to blow the particulate matter off the exterior walls.

Conventional bag house cleaning systems using suction type cleaning heads, such as that taught by Hammerquist, as well as those using compressed air cleaning, are limited in their efficiency due to the continual sweeping movement of the cleaning head. Since the cleaning head sweeps continually over the openings to the filter bags, it is only ever exactly aligned with the opening to any particular filter bag for an instant of time. Thus, each filter bag is only exposed to the full flow of the reverse cleaning air stream for that instant in time, with the remainder of the cleaning time being at a reduced air flow rate due to disalignment of the cleaning head with the opening for that particular filter bag.

One conventional solution to this problem is disclosed by U.S. Pat. No. 4,022,595 to Noland, which discloses an intermittent drive mechanism that radially advances a cleaning assembly stepwise around the circumference of the filter chamber. This results in a selected group of filter bags being in fluid communication with the reverse air stream for a finite period of time before the cleaning assembly advances to the next group of filter bags. However, the intermittent drive mechanism taught by Noland is exceedingly complex.

The Noland cleaning assembly utilizes a rotary blade blower mounted to continuously rotate about the axis of the bag house. The blower operates within a housing that is mounted to rotate independently of the blower. The housing has a transverse outlet to allow air from the blower to exit radially therefrom. Air exiting transversely from the blower urges the housing to rotate, with the air outlet revolving to sweep across groups of filter bag openings partitioned by plenums.

However, an additional mechanism of the Noland cleaning system prevents the housing from continuously rotating, causing it instead to rotate in stepwise fashion. That mechanism includes a circular plate that is mounted coaxially and above the blower housing. The circular plate is continuously rotatably driven by a motor. The underside of the plate includes a circular track formed thereon, with a stop plate cutting transversely across the track at one point. A four-legged crossbar is pinned to the top of the blower housing below the circular plate. A roller is pinned to the upper side of the end of each crossbar leg, each roller being insertable into the track formed on the bottom of the upper plate.

The crossbar leg opposite of the leg inserted into the track projects radially outward into one of the plenums opening to a group of filter bags. Each rotation of the circular plate causes the crossbar leg roller engaged in the track to hit the transverse stop plate, causing the crossbar to rotate by 45°. Rotation of the crossbar results in a third leg of the crossbar being inserted into the next plenum and allows the blower housing to rotate incrementally to blow air into a subsequent grouping of air bags.

The intermittent drive taught by Noland does result in stepwise cleaning of groups of air bags. However, the complexity of the drive mechanism renders the drive costly and prone to increased maintenance and down time.

SUMMARY OF THE INVENTION

The present invention discloses an intermittent drive for a bag house cleaning head for intermittent cleaning of open-ended bag filters mounted within the bag house. The intermittent drive includes a positioning member to which the cleaning head is connected for positioning the cleaning head to fluidly communicate with the open ends of the bag filters. A driven member is connected to the positioning member. The intermittent drive further includes a drive member that is rotatably driven about a drive axis at a constant speed by a motor. The drive member includes an engaging member disposed thereon for intermittently engaging the driven member. After the cleaning head has remained in position for a fixed period of time, the engaging member engages with the drive member to advance the positioning member and cleaning head to sequentially position the cleaning head in fluid communication with the open ends of subsequent bag filters.

In a preferred embodiment, the cleaning head includes a passageway that is in fluid communication with a reverse air stream. The cleaning head is radially mounted to a central rotatable shaft within the bag house, and is positionable so that the passageway therein is placed in fluid communication with the open ends of a first set of bag filters. A ratchet wheel is axially secured to the central shaft and is rotatable to rotate the central shaft and advance the cleaning head to communicate with the open ends of a second and subsequent sets of filter bags.

Intermittent indexing of the cleaning head into register with subsequent sets of filter bags is effected by intermittent engagement of the ratchet wheel with a drive plate that is rotated at a constant speed by a drive motor about a drive axis. A base end portion of an elongated drive arm is pinned to the upper surface of the drive plate at a point radially offset from the drive axis. A distal end portion of the drive arm projects radially from the drive plate and is intermittently engageable with the toothed periphery of the ratchet wheel.

During a part of each rotation of the drive plate, the distal end portion of the drive arm slides over one tooth of the ratchet wheel. During this part of the drive plate's rotation, the ratchet wheel remains stationary and the cleaning head remains in a position of fluid communication with a first set of filter bags. During the remaining part of each rotation of the drive plate, the distal end portion of the drive arm engages with a tooth of the ratchet wheel and causes the ratchet wheel to rotate incrementally a distance corresponding to the radial width of one tooth. Rotation of the ratchet wheel causes the cleaning head to rotatably index to fluidly communicate with a next set of bag filters.

Friction between the lower surface of the drive arm and the upper surface of the drive plate urges the drive arm in the direction of rotation of the drive plate. This frictional drag on the drive arm urges the distal end portion of the drive arm to remain in contact with the toothed periphery of the ratchet wheel. The present invention allows for incremental indexing of the cleaning head to fluidly communicate with the open ends of subsequent sets of filter bags. The drive is mechanically simple, enabling it to be constructed with low cost and reducing the likelihood of down time and the need for maintenance.

BRIEF DESCRIPTION OF THE DRAWINGS

The present invention will subsequently be described in greater detail, by way of example, with reference to the accompanying drawings in which:

FIG. 1A illustrates a cross sectional view of the cleaning head of FIG. 1;

DETAILED DESCRIPTION OF THE PREFERRED EMBODIMENT

Figure 1:
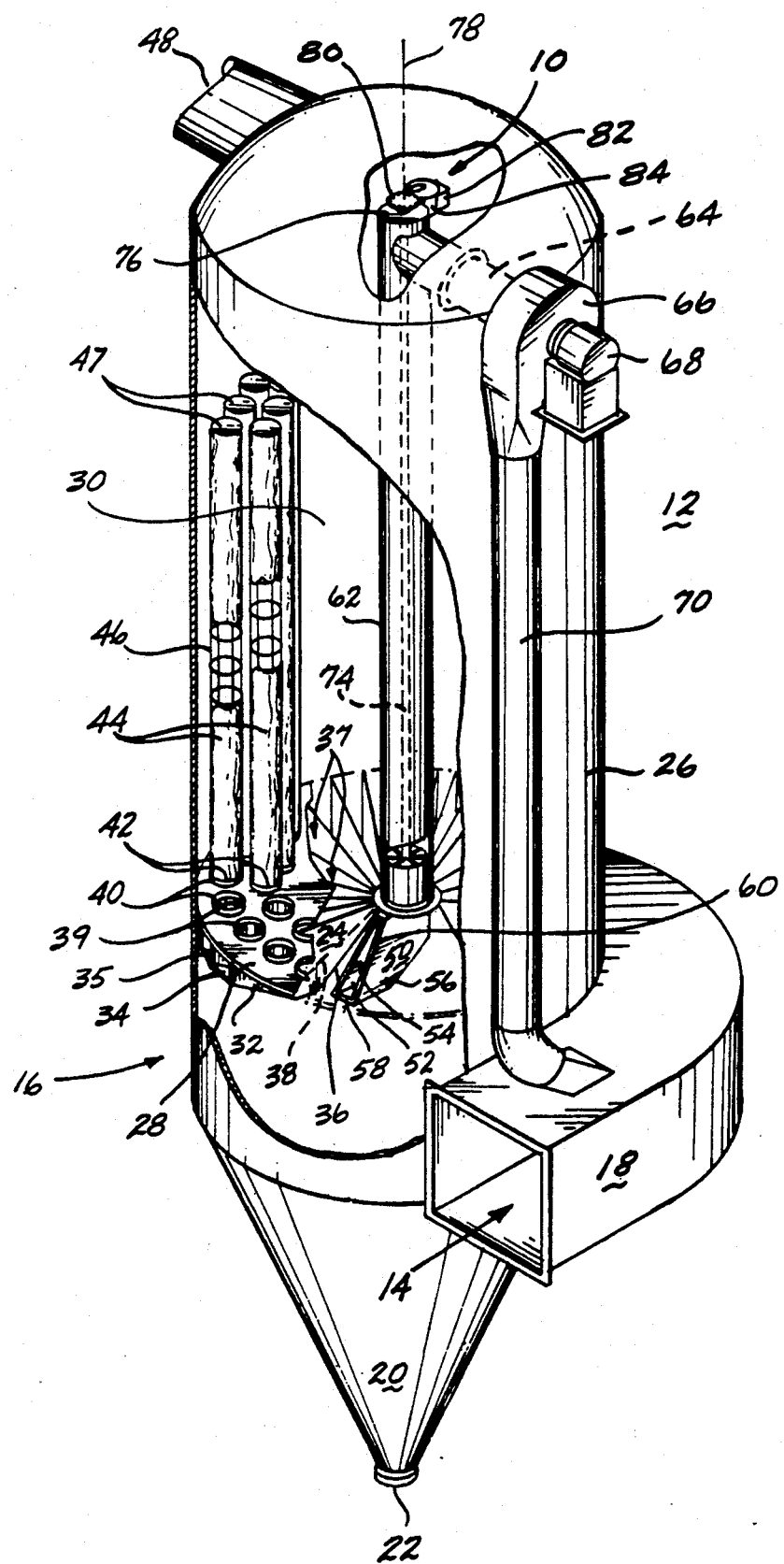
FIG. 1 illustrates a pictorial view of a conventional bag house with partial cutaways showing internal construction of the bag house and an intermittent drive constructed in accordance with the present invention mounted therein.
Figure 14:
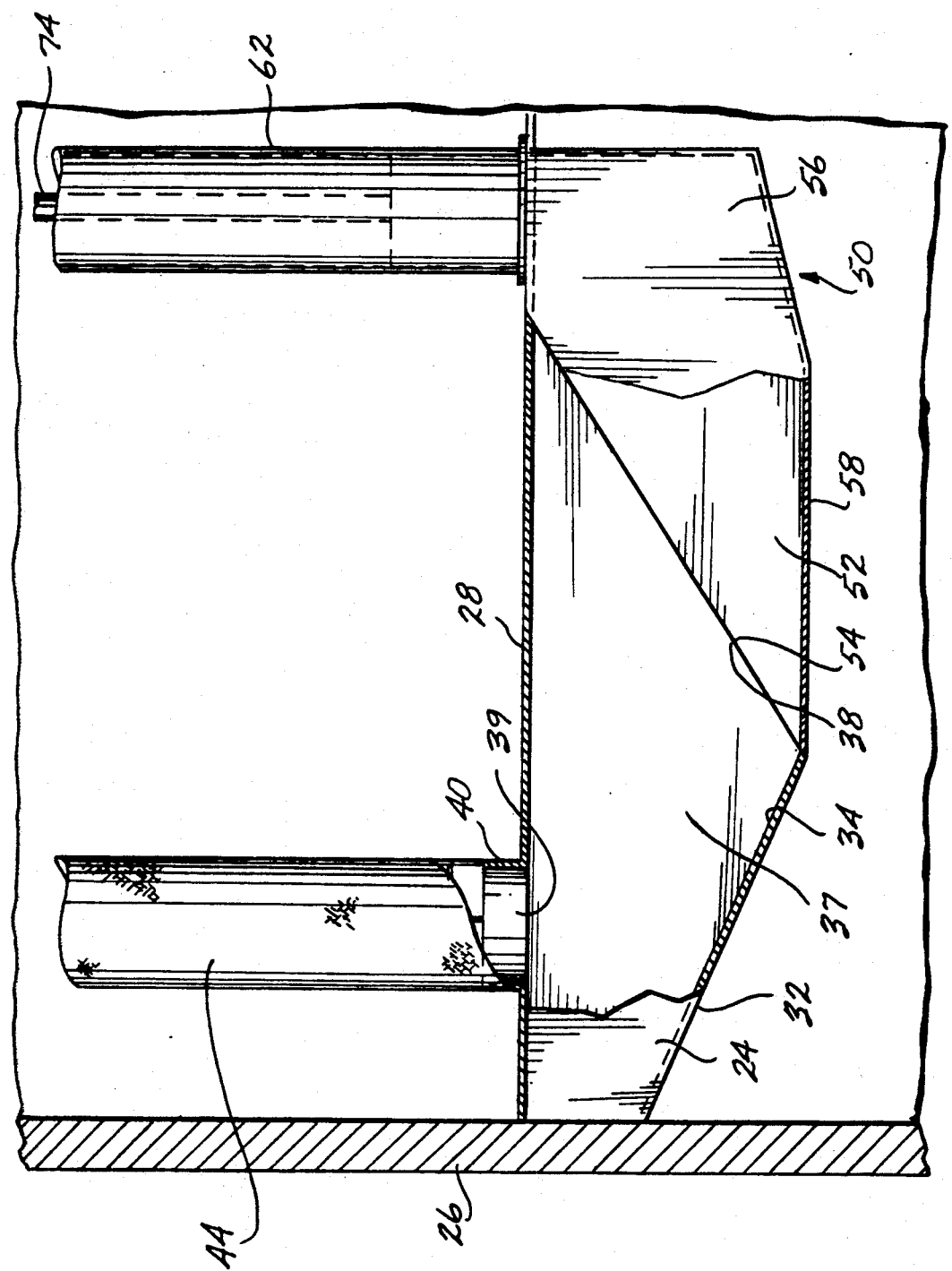

FIG. 1 illustrates a preferred embodiment of an intermittent drive 10 constructed in accordance with the present invention and operably mounted within a bag house 12. The bag house 12 is one example of a conventional bag house for which the intermittent drive 10 is well suited. The intermittent drive 10 may also be used in a variety of other conventional bag houses, and the bag house 12 illustrated in FIG. 1 and described below is not to be construed to limit the applicability of the present invention. Before describing the intermittent drive 10 in greater detail, the construction and function of the exemplary bag house 12 is briefly described.

A. BAG HOUSE CONSTRUCTION AND OPERATION

As illustrated in FIGS. 1 and 1A, an unfiltered air stream 14 enters a cyclone 16, located beneath the bag house 12, through inlet duct 18. The cyclone 16 includes a funnel-shaped lower portion 20 that terminates at a bottom particulate discharge outlet 22. A plurality of sector plates 24 are radially disposed about the lower portion of a bag house cylindrical housing 26 at an elevation above the cyclone 16 and immediately below a circular support plate 28. The portion of the bag house above the support plate 28 comprises a filter chamber 30. The bottom edges 32 of the sector plates 24 are sloped upwardly in the radially outward direction, with the bottom edges 32 of adjacent sector plates being spanned by a sloping floor plate 34. The outward edges 35 of the sector plates 24 abut against the bag house cylindrical housing 26. Only the inward edges 36 of the sector plates 24 are not closed off.

Each pair of adjacent sector plates 24, together with their corresponding floor plate 34, define an air passageway 37 having an inlet opening 38 in air flow communication with one or more circular outlet openings 39 formed in the support plate 28 at locations between adjacent sector plates 24. A receiving collar 40 having a diameter somewhat larger than that of the outlet openings 39 encircles each opening 39, extending upwardly from the upper surface of the support plate 28. The collars 40 are sized to receive the lower, open end 42 of an upwardly elongated, tubular, air pervious filter bag 44 which is engaged over an open wire frame 46. The upper ends 47 of the filter bags 44 are closed.

The larger particles of suspended particulate matter, known as heavies, that enter the cyclone 16 fall downwardly due to gravitational forces and pass out of the cyclone through the particulate outlet 22. The lighter particulate matter, or fines, travel upwardly through the cyclone, passing through the sector plate openings 38, the air passageways 37, and through sets of outlet openings 39 into the filter bags 44. The fines are collected within the filter bags 44. Since the filter bags are pervious to the air but not the particulate matter, the air passes out through the bags and exits the housing 26 through the filtered air outlet 48.

B. CLEANING HEAD

The lighter particulate matter collects on the inside surfaces of the filter bags 44 and eventually builds or cakes up. To keep the filter bags 44 from becoming clogged while still allowing the bag house 12 to operate continuously, a cleaning system is employed. The cleaning system includes a rotating suction cleaning head 50 having a passageway 52 formed therein by closed back and bottom portions (not shown), sidewalls 56 and a transverse bottom wall 58. The opening 54 to the passageway 52 is defined by the radial outer edges of the sidewalls 56 and the bottom wall 58. The radially outward edges 60 of the sidewalls 56 are sloped to closely match the inward edges 36 of the sector plates 24. The width across the cleaning head opening 54 is tapered in the upward direction to closely match the opening 38 formed between two adjacent sector plates 24. Thus, the suction head opening 54 closely aligns with the sector plate opening 38 with which the suction head is positioned.

The suction head 50 is disposed in airflow communication and rotates about the lower end of a central suction tube 62 extending upwardly to the top of the bag house housing 26. The top of the suction tube 62 is interconnected for airflow communication with a radially inward end of a horizontally disposed tube 64, with the outer end of the tube 64 connected to the inlet side of an air suction fan 66 that is powered by an electric fan motor 68. The outlet side of the fan 66 is airflow connected to a downwardly extending exhaust pipe 70. The lower end of the exhaust pipe 70 is connected in airflow communication with the inlet duct 18 of the cyclone 16.

The suction head 50 is rotated within the lower end of the stationary, vertical suction tube 62 by a vertical central drive shaft 74, to which the suction head is radially mounted, disposed within the interior of the suction tube 62. The upper end of the central drive shaft 74 extends upwardly through a central opening formed in a cap 76 that closes off the upper end of suction tube 62. The central drive shaft 74 is rotatable about a central axis 78 by the intermittent drive 10, which is mounted to the top of the central drive shaft 74 atop the cap 76.

The intermittent drive 10 intermittently and rotatably indexes the suction head 50 so that the suction head opening 54 is substantially aligned adjacent the sector plate opening 38, corresponding to a set of filter bags 44. This enables a substantial suction to be applied through the passageway 52 of the suction head 50 and the air passageway 37 defined by the sector plates 24 with which the suction head 50 is in registry. The resulting suction force draws through the openings 39 leading to the associated filter bags 44, causing the filter bags to collapse inwardly against their corresponding frames 46. As a result, the caked-on particulate matter falls away from the inside surface of the filter bags and downwardly through the floor support plate openings 39, between adjacent sector plates 24 and into the suction head 50.

From the suction head 50, the removed particulate matter flows upwardly through the suction tube 62, radially through the horizontal tube 64, through the suction fan 66 and then downwardly through the exhaust pipe 70 and into the inlet 18 of the cyclone 16. Most of this particulate matter then falls downwardly into the cyclone funnel 20 and out through the particulate outlet 22 thereof.

C. INTERMITTENT DRIVE

Figure 2:
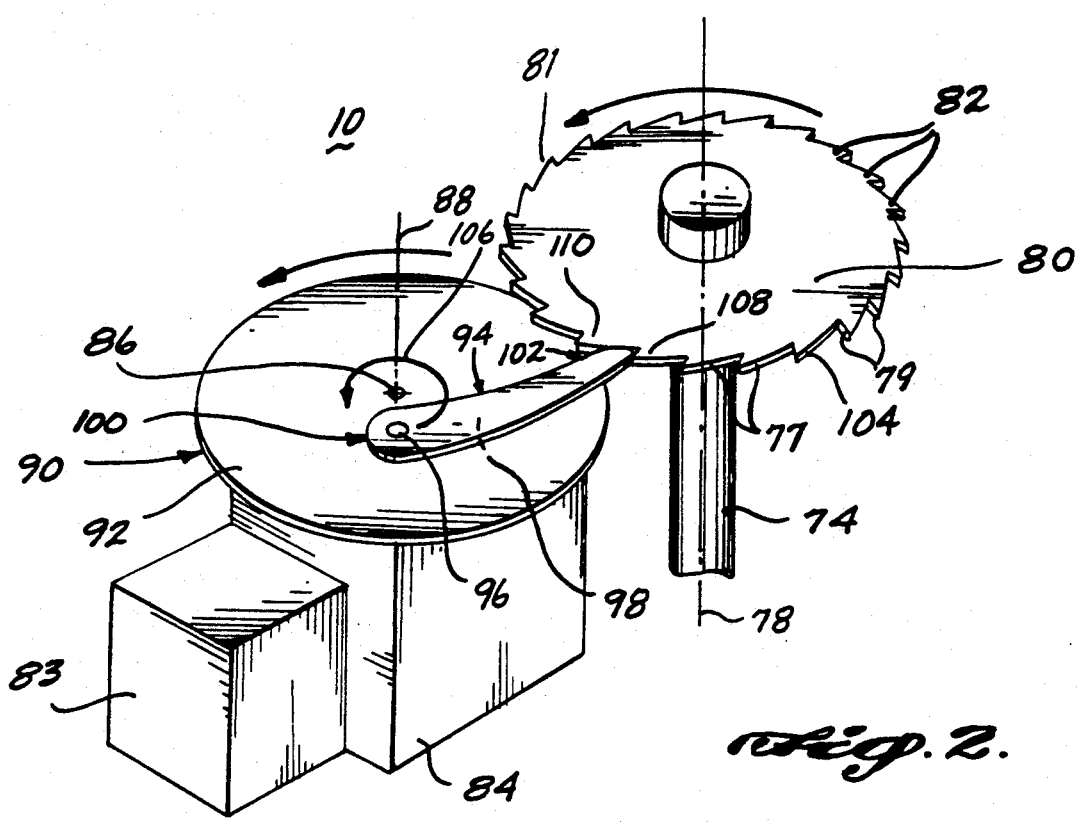
FIG. 2 illustrates a pictorial view of the intermittent drive mechanism of FIG. 1 in position to rotatably advance the cleaning head.
Figure 3:
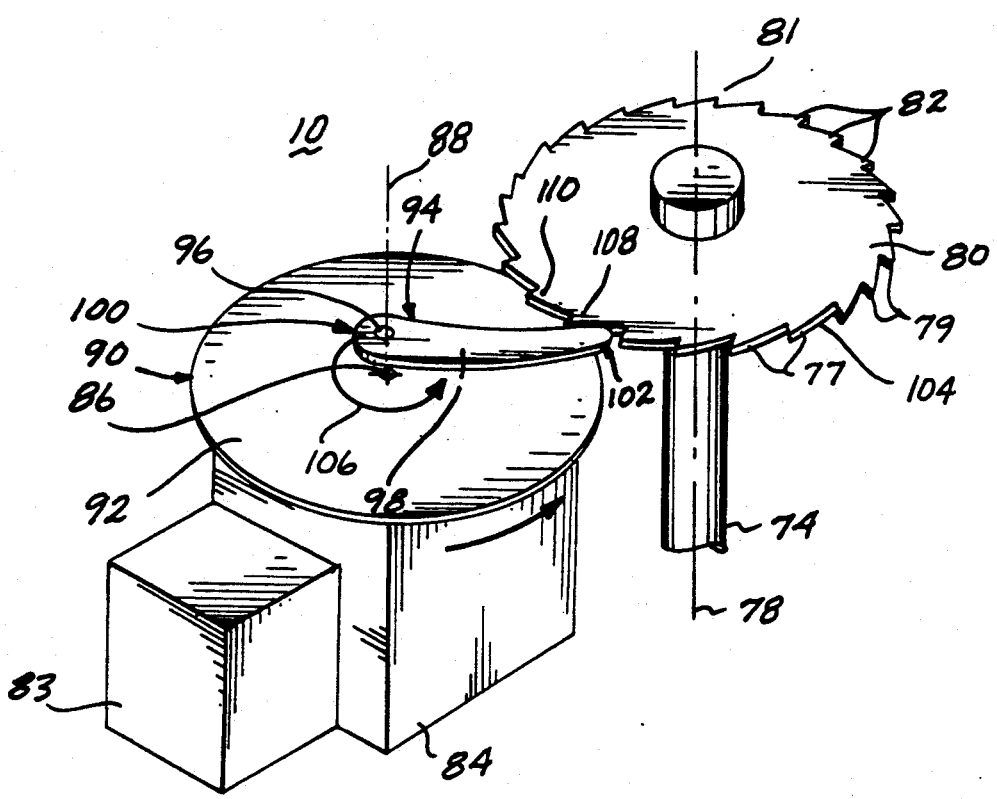
FIG. 3 illustrates a pictorial view of the intermittent drive mechanism of FIG. 1 in a position wherein the cleaning head remains stationary.

A preferred embodiment of an intermittent drive 10 for sequential indexing of the cleaning head 50 will now be described. Referring additionally to FIGS. 2 and 3, a driven ratchet wheel 80 is secured axially about the central axis 78 to the upper end of the central drive shaft 74 by a conventional method. The circular outer periphery 81 of the ratchet wheel 80 defines saw-tooth shaped teeth 82. Each tooth 82 of the ratchet wheel 80 has a long side 77 and a short side 79.

In the preferred embodiment, the number of teeth 82 located about the periphery of the ratchet wheel 80 is equal to the number of sector plate passageways 37 present in the bag house. However, as shall be described, a greater number of teeth corresponding to multiples of the number of sector plate passageways 37 may also be utilized with a proportional decrease in the radial width of each ratchet tooth 82. A conventional electric drive motor 83 is mechanically coupled to a conventional speed reduction gear box 84 that is mounted to the upper exterior of the central suction tube 62, as shown in FIG. 1.

Referring again to FIGS. 2 and 3, a stub drive shaft 86 projects upwardly from the speed reduction box 84 and is rotatably driven about a drive axis 88 by the drive motor 83 via the speed reduction box 84. The drive axis 88 is substantially parallel to the central axis 78 of the central drive shaft 74. A drive plate 90 is secured to the upper extremity of the drive shaft 86 so as to be rotatable with the drive shaft. For purposes of illustration, the drive plate 90 is shown as rotating in the counterclockwise direction. In the preferred embodiment illustrated in FIGS. 2 and 3, the drive plate 90 defines a circular perimeter about axis 88, although other configurations or the drive plate would be equally suitable. The upper surface of the drive plate 90 forms a relatively flat first friction surface 92.

A base end portion 100 of an elongated drive arm 94 is rotatably pinned by an upwardly projecting pin 96 to the upper surface 92 of the drive plate at a point radially offset from the drive axis 88. In the preferred embodiment, the drive arm 94 is machined or otherwise formed from plate metal. The bottom surface of the drive arm 94 forms a relatively flat second friction surface 98. The elongated drive arm 94 tapers slightly along its length, and curves in a gradual arcuate configuration toward a distal end portion 102. As illustrated in FIG. 2, distal end portion 102 defines a generally semicircular periphery.

The second friction surface 98 of the drive arm 94 overlies and contacts the first friction surface 92 of the drive plate 90. In the preferred embodiment, both the drive plate 90 and the drive arm 94 are fabricated from plate metal such as steel. However, other types of metal or other materials such as fiber-reinforced thermoset plastic composites would be suitable so long as their surfaces do not exhibit greatly reduced friction coefficients. In a preferred embodiment illustrated, the first and second friction surfaces 92 and 98 are standard rolled plate metal surfaces without any special surface texturing; however, the surfaces could be textured to increase the friction coefficients of those two surfaces.

The drive plate 90 is mounted on the drive shaft 86 such that the upper surface 92 of the drive plate 90 is disposed on a plane generally parallel to and slightly below a plane defined by the lower surface 104 of the ratchet wheel 80. Thus the drive arm 94 is generally horizontally aligned with the outer circular periphery 81 of the ratchet wheel 80, as illustrated in FIG. 2.

The drive plate 90 is rotated continuously by the drive motor 83. As the drive plate 90 rotates, the pin 96 securing the drive arm 94 traces a circular path 106 about the drive axis 88, as shown in FIGS. 2 and 3. The top of the pin 86 to which the drive plate 90 is mounted, is flush with the upper first friction surface 92 of the drive plate so as not to interfere with the bottom friction surface 98 of the drive arm 94.

The drive arm 94 is configured to have a length that is greater than the greatest distance obtained between the pin 96 on the drive plate 90 and the outer periphery 81 of the ratchet wheel 80 when the pin 96 is rotated away from the ratchet wheel 80. As the drive plate 90 rotates in the counterclockwise direction, the frictional contact between the bottom friction surface 98 of the drive arm 94 and the upper friction surface 92 of the drive plate 90 drags the drive arm 94 along with the drive plate 90, i.e., urges the drive arm 94 in the counterclockwise direction of rotation of the drive plate.

When the drive motor 83 initially activates upon the start of bag house operation, the drive arm 94 travels with the drive plate 90 until the distal end portion 102 of the drive arm 94 intersects with and contacts the toothed outer periphery 81 of the ratchet wheel 80. As the drive plate 90 continues to rotate, the distal end portion 102 of the drive arm 94 is continually urged against the circular outer periphery 81 of the ratchet wheel 80.

Reference is now had to FIG. 3 to describe the intermittent rotational advancement, or indexing, of the ratchet wheel 80. The ratchet wheel 80 is normally disconnected from driving engagement with the drive motor 83; thus, the ratchet wheel 80, central drive shaft 74, and cleaning head 50 secured thereto are normally stationary. However, during a portion of the rotation of the drive plate 90, the distal end portion 102 of the drive arm 94 engages with a tooth 82 of the ratchet wheel 80 to rotatably index the ratchet wheel. The teeth 82 function as stops, spaced evenly about the ratchet wheel's periphery 81, against which the distal end portion 102 of the drive arm 94 pushes.

During a first part of the rotation cycle of the drive plate 90, the pin 96 securing the drive arm 94 to the drive plate revolves away from the ratchet wheel 80 around the circular path 106, and the distal end portion 102 of the drive arm 94 slides over the long side 75 of what is noted in FIG. 3 as the leading tooth 108. During this part of the rotation cycle of the drive plate 90, the ratchet wheel 80 is stationary. However, as the pin 96 approaches the point of its revolution around the drive axis 88 that is furthest from the ratchet wheel 80, the distal end portion 102 of the drive arm 94 "drops" off of the long side 77 of the leading tooth 108 and onto the long side 77 of the next tooth, denoted in FIG. 3 as the following tooth 110.

Referring now to FIG. 2, as the pin 96 continues its revolution around the drive axis 88, the distal end portion 102 of the drive arm 94 engages with the intersection of the long side 77 of the following tooth 110 and the short side 79 of the leading tooth 108. As shown in FIG. 2, the pin 96 continues to revolve around the path 106 and approaches the ratchet wheel 80 during this part of the rotation cycle of the drive plate 90. As the pin 96 closes the distance to the ratchet wheel 80, the distal end portion 102 of the drive arm 94 pushes against the short side 79 of the leading tooth 108 and rotatably advances the ratchet wheel 80 a radial distance corresponding to the radial width of one tooth 82.

Once the drive plate 90 completes the rotation cycle, the pin 96 passes the point of nearest proximity to the ratchet wheel 80, and continues to move in its revolution about drive axis 88 away from the ratchet wheel 80. Thus a new rotation cycle of the drive plate 90 starts, and the drive arm 94 disengages from the tooth that it has just pushed and commences sliding over the long side of the next tooth, with the ratchet wheel again stationary for a finite period of time.

Thus while the drive plate 90 rotates continuously, the ratchet wheel 80 incrementally starts and stops with each rotation of the drive plate 90. The radial width of each ratchet wheel tooth 82 along side 77 is such that each incremental advancement of the ratchet wheel 80 rotatably indexes the cleaning head 50 from a position in registry with a first set of filter bags 44 and sector plate opening 38 to a position in registry with the next subsequent set of filter bags 44 and sector plate opening 38. One complete rotation of the ratchet wheel 80 through all of its indexed positions results in the exposure of each set of filter bags 44 to the full suction drawn through the passageway 52 of the suction head 50 for a finite period of time.

It should be apparent that if the number of teeth 82 on the ratchet wheel 80 were doubled, with the radial width of each tooth being halved, each rotation of the drive plate 90 would result in the rotatable indexing of the ratchet wheel 80 by a radial distance corresponding to the width of two teeth 82. Similarly, one could extrapolate for threefold or greater the number of teeth.

In the preferred embodiment illustrated, the drive arm 94 has an arcuate configuration between the base end portion 98 and the distal end portion 102. An arcuate configuration is helpful when the diameter of the ratchet wheel 80 is sufficiently large due to the size of the bag house that the drive arm 94 must "wrap around" a portion of the periphery 81 of the ratchet wheel during rotation of the drive plate. However, the arcuate configuration is not required in all cases, such as when the ratchet wheel is of relatively small diameter.

It should also be apparent that the preferred embodiment for an intermittent drive 10 described above would work equally well in a bag house that utilizes reverse air flows from that described for the bag house 12. In one type of conventional bag house, the main air stream flows from the outside of the filter bags, through the filter bag walls into the filter bags, and out through their openings. In such a configuration (not shown), the cleaning head would exert a positive air pressure or pulse of compressed air when aligned with a particular set of filter bags to "blow" caked particulate matter off of the outside of the filter bags. The preferred embodiment of the intermittent drive described above would be equally well suited for such a configuration of bag house.

The preferred embodiment described above utilizes the frictional drag resulting between the drive arm 94 and of the drive plate 90 to urge the distal end portion 102 of the drive arm into intermittent engagement with the teeth 82 of the ratchet wheel 80. It should be apparent that other simple mechanisms within the scope of the present invention for urging the drive arm 94 into engagement with the ratchet wheel are possible. In one such alternate embodiment (not shown), a leaf spring has a first end secured to the drive plate at a point located between the pin securing the drive arm and the outer periphery of the drive plate, and a second end secured midway along the length of the drive arm. The force of the spring serves to urge the drive arm into engagement with the ratchet wheel.

It will also be appreciated based on the disclosure herein that other configurations of driven wheels coacting with drive plates that include integral engagement mechanisms thereon may be employed consistent with the present invention. One such alternate embodiment, not shown, utilizes a driven wheel having radially spaced-apart teeth formed around the outer circumference thereof, and a rotatable drive pinion with a single recessed tooth formed in the outer periphery thereof. The recessed tooth of the drive pinion engages with a tooth of the driven wheel once each revolution for intermittent advancement of the driven wheel. Another such alternate embodiment, not shown, would be the substitution of a Geneva stop type drive for the ratchet and pawl mechanism described above.

It should be further apparent that the intermittent drive of the present invention may also be used for bag houses having filter bags that are arranged other than radially therein, and a cleaning head that is positioned by means other than rotation about a central axis.

The present invention has been described in relation to a preferred embodiment and several variations thereof. One of ordinary skill may be able to effect other changes or alterations based on the disclosure of the specification. Thus, it is to be understood that the invention is not to be limited to the specific embodiments illustrated and described. Rather, the true scope and spirit of the invention are to be determined by reference to the following claims.

The embodiments of the invention in which an exclusive property or privilege is claimed are defined as follows:

1. A bag house with an intermittently driven cleaning head, comprising:
    a housing;
    a plurality of sets of open-ended bag filters mounted within the housing;
    means associated with the bag house for generating a stream of air;
    a cleaning head mounted within the housing proximate the open ends of the bag filters; and
    an intermittent drive for the cleaning head, including;
    positioning means connected to the cleaning head for sequentially positioning the cleaning head and means to fluidly communicate with the open ends of a set of bag filters, thereby placing the set of bag filters in fluid communication with the means for generating a stream of air;
    a driven member connected to the positioning means for advancing the positioning means;
    a drive member rotatable about a drive axis at a constant speed;
    drive means for continuously rotating the drive member; and
    engaging means disposed on the drive member for intermittently engaging the driven member, after the cleaning head and positioning means have remained in a stationary position for a fixed period of time, to sequentially retain the positioning means in a stationary position for sequential positioning of the cleaning head in fluid communication with the open ends of a subsequent set of bag filters.

2. The bag house of claim 1, further comprising means for urging the engaging means into engagement with the driven member.

3. The bag house of claim 2, wherein the means for urging the engaging means comprises:
    a first friction surface defined by the drive member; and
    a second friction surface defined by the engaging means and frictionally contacting the first friction surface during rotation of the drive member to urge the engaging means into engagement with the driven member.

4. The bag house of claim 3, wherein the engaging means includes a drive arm having a base end portion pinned to the drive member at a location radially offset from the drive axis of the drive member and a distal end portion engagable with the driven member, the driven member remaining stationary during a fixed period of each rotation of the drive member and the drive arm then engaging with the driven member during a part of each rotation of the drive member to advance the driven member, the drive arm defining the second friction surface, the frictional contact between the first and second friction surfaces urging the distal end portion of the drive arm into engagement with the driven member.

5. The bag house of claim 4, wherein the drive arm comprises an elongated flat plate.

6. The bag house of claim 5, wherein the drive arm has an arcuate configuration.

7. The bag house of claim 1, wherein the driven member is rotatably advanced when engaged by the engaging means.

8. The bag house of claim 7, wherein the driven member includes a plurality of stop means spaced apart along the outer periphery of the driven member.

9. The bag house of claim 8, wherein the engaging means includes a drive arm having a base end portion pinned to the drive member at a location radially offset from the drive axis of the drive member and a distal end portion engagable with the stop means of the driven member, the driven member remaining stationary during a fixed period of each rotation of the drive member and the drive arm then engaging with a stop means of the driven member during a part of each rotation of the drive member to advance the driven member a radial distance corresponding to the distance between adjacent stop means.

10. The bag house of claim 9, wherein the positioning means includes a rotatable central shaft and the driven member is secured to the central shaft.

11. The bag house of claim 10, wherein the central shaft defines a central axis of rotation parallel to the drive axis of the drive member and the driven member is axially secured to the central shaft.

12. A bag house with an intermittently sequenced head assembly, comprising:
    a housing;
    a plurality of sets of open-ended bag filters mounted within the housing and nominally in fluid communication with means supplying an unfiltered air stream;
    means associated with the bag house for generating an air stream flowing reverse of the unfiltered air stream to clean the bag filters;
    a cleaning head having a passageway therein and means to fluidly communicate with the means for creating a reverse air stream the cleaning head being positionable to fluidly engage the passageway therein with the open ends of the bag filters;

positioning means connected to the cleaning head for sequentially positioning the cleaning head;

a driven member connected to the positioning means for advancing the positioning means;

a drive member continuously rotatable about a drive axis at a constant speed by a drive means;

drive means for continuously rotating the drive member; and engaging means disposed on the drive member for intermittently engaging the drive member to index the driven member and sequentially advance the positioning means from a position wherein the cleaning head is in registry with the open ends of a first set of bag filters, after the cleaning head has remained stationary in position with such first set of bag filters for a fixed period of time, to sequentially retain position the passageway of the cleaning head in a stationary position in fluid flow communication with the open ends of a second and subsequent sets of bag filters.

13. The bag house of claim 12, wherein the cleaning head comprises a suction head having a passageway therein, the suction head drawing a suction on the bag filters when the passageway is fluidly engaged with the open ends of the bag filters.

14. The bag house of claim 12, wherein the engaging means includes a drive arm having a base end portion pinned to the drive member at a location radially offset from the drive axis of the drive member and a distal end portion engagable with the driven member, the driven member remaining stationary during a fixed period of each rotation of the drive member and the drive arm then engaging with the driven member during a part of each rotation of the drive member to advance the driven member.

15. The bag house of claim 14, wherein the driven member includes a circular outer periphery in the form of a plurality of teeth that are engageable by the distal end portion of the drive arm, the driven member being rotatably connected to the positioning means and rotatably indexing when the teeth are engaged by the distal end portion of the drive arm.

16. The bag house of claim 15, wherein the positioning means includes a rotatable central shaft mounted within the bag house, the cleaning head is radially mounted on the central shaft, and the driven member is secured to the central shaft.

17. The bag house of claim 16, wherein the cleaning head comprises a suction head having a passageway therein, the suction head drawing a suction on the bag filters when the passageway is fluidly engaged with the open ends of the bag filters.

18. The bag house of claim 12, further comprising means for urging the engaging means into engagement with the driven member.

19. The bag house of claim 18, wherein the means for urging the engaging means is formed integrally with the engaging means.

20. The bag house of claim 19, wherein the engaging means includes a drive arm having a base end portion pinned to the drive member at a location radially offset from the drive axis of the drive member and a distal end portion engagable with the driven member, the driven member remaining stationary during a fixed period of each rotation of the drive member and the drive arm then engaging with the driven member during a part of each rotation of the drive member to index the driven member.

21. The bag house of claim 20, wherein the means for urging the engaging means comprises:
 a first friction surface defined by the drive member about the pinned base end portion of the drive arm; and
 a second friction surface defined by the drive arm and frictionally contacting the first friction surface during rotation of the drive member to urge the distal end portion of the drive arm in the direction of rotation of the drive member.

22. The bag house of claim 21, wherein the drive arm comprises an elongated flat plate.

23. The bag house of claim 22, wherein the drive arm has an arcuate configuration.

* * * * *